(12) United States Patent
Goda (10) Patent No.: US 10,234,541 B2
(45) Date of Patent: Mar. 19, 2019

(54) FMCW RADAR DEVICE

(71) Applicant: Mitsubishi Electric Corporation, Tokyo (JP)

(72) Inventor: Yuichi Goda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 324 days.

(21) Appl. No.: 15/290,649

(22) Filed: Oct. 11, 2016

(65) Prior Publication Data

US 2017/0307727 A1    Oct. 26, 2017

(30) Foreign Application Priority Data

Apr. 21, 2016 (JP) ................................ 2016-085105

(51) Int. Cl.
| | |
|---|---|
| G01S 13/34 | (2006.01) |
| G01S 7/35 | (2006.01) |
| G01S 13/58 | (2006.01) |
| G01S 13/93 | (2006.01) |
| G01S 13/66 | (2006.01) |

(52) U.S. Cl.
CPC .............. *G01S 7/352* (2013.01); *G01S 7/354* (2013.01); *G01S 13/341* (2013.01); *G01S 13/345* (2013.01); *G01S 13/584* (2013.01); *G01S 13/66* (2013.01); *G01S 13/931* (2013.01)

(58) Field of Classification Search
CPC .... G01S 13/341; G01S 13/345; G01S 13/584; G01S 13/66; G01S 13/931; G01S 7/352; G01S 7/354

USPC ......................................................... 342/105
See application file for complete search history.

(56) References Cited

U.S. PATENT DOCUMENTS

2015/0378016 A1* 12/2015 Schoor .................. G01S 13/345
                                                                  342/21

FOREIGN PATENT DOCUMENTS

| JP | 4-343084 A | 11/1992 |
|---|---|---|
| JP | 2009-541719 A | 11/2009 |
| JP | 2010-19824 A | 1/2010 |
| JP | 2012-68035 A | 4/2012 |
| WO | 2013/088938 A1 | 6/2013 |
| WO | 2014/147859 A1 | 9/2014 |

OTHER PUBLICATIONS

Communication dated Apr. 25, 2017 issued by the Japanese Patent Office in counterpart application No. 2016-085105.

* cited by examiner

*Primary Examiner* — Timothy A Brainard
(74) *Attorney, Agent, or Firm* — Sughrue Mion, PLLC; Richard C. Turner (57) ABSTRACT

Provided is an FMCW radar device capable of reducing pairing errors. With use of a first peak frequency change rate during a first chirp period and a second peak frequency change rate during a second chirp period, a first temporary range during the first chirp period and a second temporary range during the second chirp period are calculated. When a difference between the first temporary range and the second temporary range is equal to or less than a set threshold, a first peak frequency and a second peak frequency in a current processing period are paired with each other.

8 Claims, 4 Drawing Sheets

FMCW RADAR DEVICE

BACKGROUND OF THE INVENTION

1. Field of the Invention

The present invention relates to a frequency modulated continuous wave (FMCW) radar device configured to measure a range, a relative velocity, an angle, and the like of an object to be measured (hereinafter referred to as "target").

2. Description of the Related Art

Hitherto, an FMCW radar device is utilized as an on-vehicle radar device. For example, measurement results of a range, a relative velocity, an angle, and the like of a target, which are measured by the FMCW radar device, are used in a collision mitigation brake (CMB) system for decreasing damage when an own vehicle collides with a forward obstacle, and in an adaptive cruise control (ACC) system for tracking a forward vehicle.

In the related-art FMCW radar device, there is known a method of calculating the range, the relative velocity, and the like of the target by providing an up-chirp period in which a frequency of a transmission signal increases as time elapses and a down-chirp period in which the frequency of the transmission signal decreases as time elapses, and by pairing the peaks detected during the up-chirp period and the down-chirp period.

However, particularly in an on-vehicle environment, there are a large number of reflection objects on a road, such as guardrails, vehicles, humans, and walls, and hence reflections are obtained as many as the number of the reflection objects during the up-chirp period and the down-chirp period. Therefore, erroneous peaks may be paired at the time of pairing. As a result, a target that does not actually exist may be erroneously detected, or a target that actually exists may not be detected.

In view of this, as a method of reducing pairing errors in the FMCW radar, there is given a method of performing pairing assuming that a combination of peaks, which appear in a frequency spectrum of a reception signal and have substantially the same intensity, is obtained from the same target (for example, see Japanese Patent Application Laid-open No. Hei 4-343084).

Further, there is also given a method of reducing pairing errors by performing processing of tracking a beat frequency, to thereby calculate a range and a range change rate of the target based on beat frequency time-series data (for example, see Japanese Patent Application Laid-open No. 2010-19824).

However, the related art has the following problems.

In the related art disclosed in Japanese Patent Application Laid-open No. Hei 4-343084, pairing is performed with use of the peak intensity, and hence an erroneous pair may be obtained when there are a plurality of reflections having near peak intensities.

Further, in the related art described in Japanese Patent Application Laid-open No. 2010-19824, the range and the range change rate of the target are calculated before pairing by the processing of tracking the beat frequency, and then the pairing is performed, to thereby improve the pairing accuracy. However, this method assumes a linear uniform motion. Therefore, when the own vehicle and the target accelerate or decelerate and an error is caused in the range or the relative velocity calculated by the processing of tracking the beat frequency, differences between the range and the relative velocity during the up-chirp period and the range and the relative velocity during the down-chirp period are increased. As a result, there arises a problem in that correct pairing cannot be performed.

SUMMARY OF THE INVENTION

The present invention has been made to solve the above-mentioned problems, and has an object to provide an FMCW radar device capable of reducing pairing errors.

According to one embodiment of the present invention, there is provided an FMCW radar device, including: a transmission signal generator configured to generate a transmission signal having a first chirp period and a second chirp period; a transmitter configured to radiate the transmission signal to a space; a receiver configured to receive the transmission signal reflected from a target to acquire a reception signal; a beat signal generator configured to generate a beat signal by mixing the reception signal and the transmission signal; and a signal processor, the signal processor including: a beat frequency distribution generating unit configured to generate a first beat frequency distribution by analyzing a frequency of the beat signal during the first chirp period, and to generate a second beat frequency distribution by analyzing a frequency of the beat signal during the second chirp period; a peak detecting unit configured to detect a first peak frequency from the first beat frequency distribution, and to detect a second peak frequency from the second beat frequency distribution; a peak frequency change rate calculating unit configured to calculate a first peak frequency change rate based on the first peak frequency in a current processing period and the first peak frequency in a previous processing period performed before the current processing period, and to calculate a second peak frequency change rate based on the second peak frequency in the current processing period and the second peak frequency in the previous processing period; and a pairing unit configured to: calculate a range change rate and a relative velocity change rate based on the first peak frequency change rate and the second peak frequency change rate; calculate a relative velocity estimated value in the current processing period based on the range change rate and the relative velocity change rate; calculate a first temporary range based on the relative velocity estimated value and the first peak frequency in the current processing period; calculate a second temporary range based on the relative velocity estimated value and the second peak frequency in the current processing period; and pair the first peak frequency and the second peak frequency in the current processing period with each other when a difference between the first temporary range and the second temporary range is equal to or less than a set threshold.

According to the present invention, the FMCW radar device capable of reducing pairing errors can be obtained.

DETAILED DESCRIPTION OF THE PREFERRED EMBODIMENTS

Now, an FMCW radar device of the present invention is described with reference to the drawings by means of an exemplary embodiment. In the description of the drawings, like parts or corresponding parts are denoted by like reference symbols, and redundant description thereof is omitted. In the embodiment, there is exemplified a case where the FMCW radar device is mounted on an own vehicle.

First Embodiment

Figure 1:
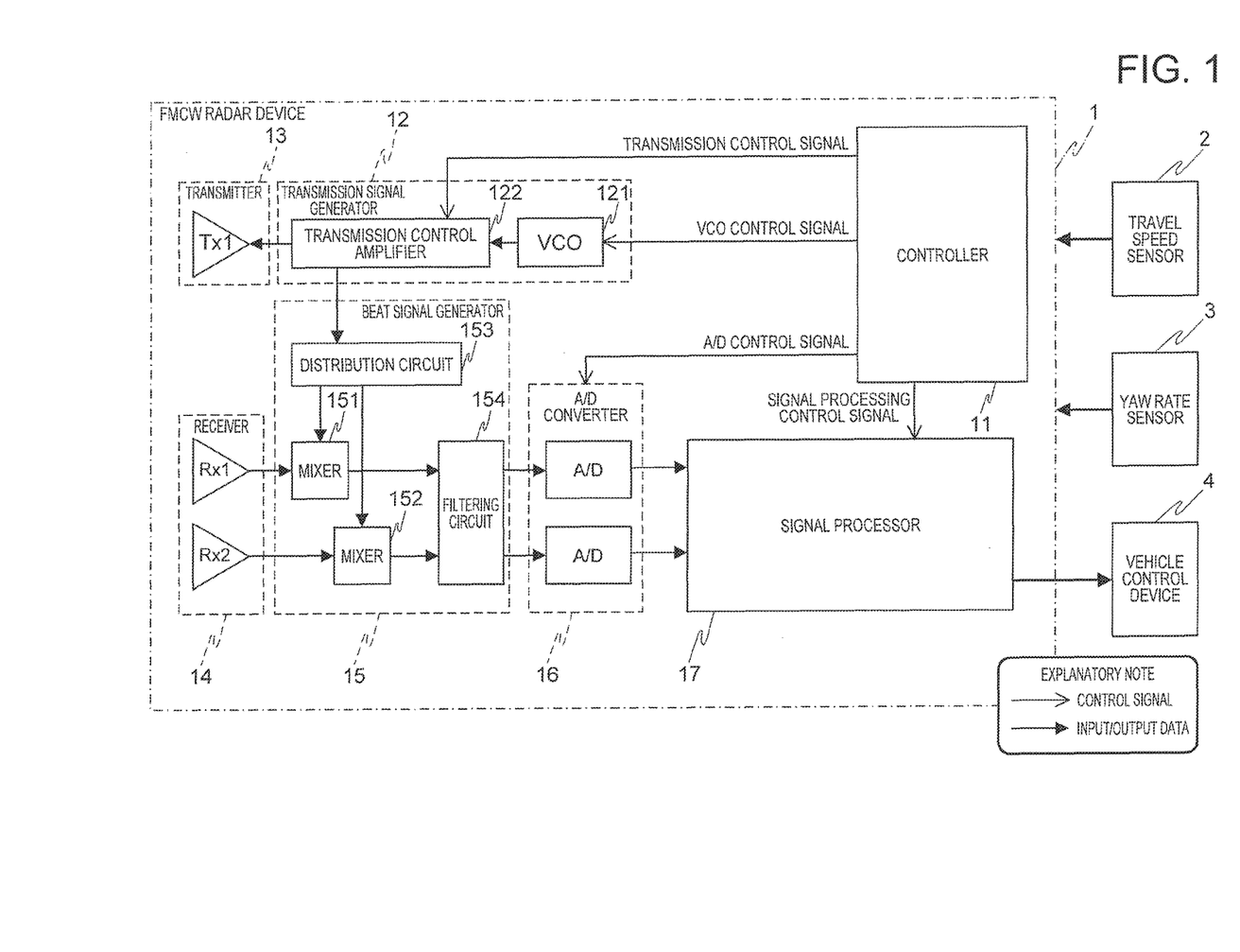
FIG. 1 is a block diagram for illustrating a configuration of an FMCW radar device according to a first embodiment of the present invention.

FIG. 1 is a block diagram for illustrating a configuration of an FMCW radar device 1 according to a first embodiment of the present invention. In FIG. 1, there are also illustrated a travel speed sensor 2 configured to observe a travel speed of the own vehicle on which the FMCW radar device 1 is mounted, a yaw rate sensor 3 configured to observe a yaw rate of the own vehicle, and a vehicle control device 4 configured to control the own vehicle.

The FMCW radar device 1 illustrated in FIG. 1 includes a controller 11, a transmission signal generator 12, a transmitter 13, a receiver 14, a beat signal generator 15, an A/D converter 16, and a signal processor 17. In the first embodiment, although the FMCW radar device 1 is independent of an antenna configuration and angular measurement processing, there is exemplified a case where the FMCW radar device 1 is constructed as an FMCW radar device employing a phase mono-pulse system, which includes one antenna Tx1 and two antennas Rx1 and Rx2.

The controller 11 is configured to output a VCO control signal, a transmission control signal, an A/D control signal, and a signal processing control signal to be described later, to thereby control, e.g., operation timing of each component of the FMCW radar device 1. The controller 11 is constructed with use of, for example, at least one of a dedicated logic circuit, a general-purpose central processing unit (CPU), or a digital signal processor (DSP). Further, the controller 11 is configured to execute a program stored in a data storage circuit, that is, a memory.

The transmission signal generator 12 includes a voltage controlled oscillator (VCO) 121 and a transmission control amplifier 122. The VCO 121 is configured to generate a transmission signal modulated such that its frequency temporally changes, based on the VCO control signal input from the controller 11, that is, a control voltage of the VCO 121. Further, the VCO 121 is configured to output the generated transmission signal to the transmission control amplifier 122.

Figure 2:
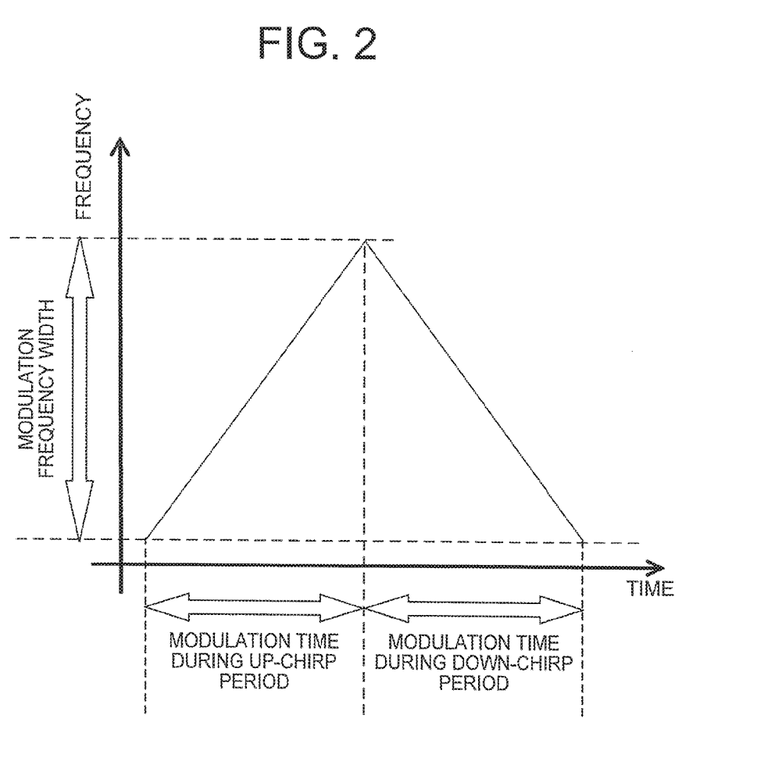
FIG. 2 is an explanatory graph for showing an example of a modulation pattern of a transmission signal to be generated by a transmission signal generator according to the first embodiment of the present invention.

Now, an example of a modulation pattern of the transmission signal is described with reference to FIG. 2. FIG. 2 is an explanatory graph for showing an example of a modulation pattern of the transmission signal to be generated by the transmission signal generator 12 according to the first embodiment of the present invention. In FIG. 2, the lateral axis represents time, and the vertical axis represents frequency.

As shown in FIG. 2, the transmission signal has, within a certain observation period set in advance, an up-chirp period being a first chirp period, and a down-chirp period being a second chirp period. During the up-chirp period, the frequency of the transmission signal increases as time elapses, and the frequency is modulated in a modulation time and a modulation frequency width that are set in advance. During the down-chirp period, the frequency of the transmission signal decreases as time elapses, and the frequency is modulated in a modulation time and a modulation frequency width that are set in advance.

In the first embodiment, description is mainly made of a case where, as shown in FIG. 2, the transmission signal has the up-chirp period and the down-chirp period. However, the transmission signal is not always required to have both of the up-chirp period and the down-chirp period. As described later, it is only required to provide a combination of chirps having at least different range resolutions or different relative velocity resolutions.

In this case, the range resolution or the relative velocity resolution is determined based on the modulation time or the modulation frequency width as described later. In view of this, the transmission signal may have, for example, a plurality of up-chirp periods having different modulation times and different modulation frequency widths, or a plurality of down-chirp periods having different modulation times and different modulation frequency widths.

Referring back to FIG. 1, the transmission control amplifier 122 is configured to amplify the transmission signal input from the VCO 121 to a defined magnitude based on the transmission control signal input from the controller 11, and to output the amplified transmission signal to the transmitter 13 and the beat signal generator 15.

As described above, the transmission signal generator 12 is configured to generate a transmission signal having an up-chirp period being a first chirp period and a down-chirp period being a second chirp period, and to output the transmission signal to the transmitter 13 and the beat signal generator 15.

The transmitter 13 includes the antenna Tx1. The receiver 14 includes the antenna Rx1 and the antenna Rx2.

The antenna Tx1 is configured to transmit the amplified transmission signal input from the transmission control amplifier 122 to a space. An electromagnetic wave being the transmission signal transmitted to the space is radiated to a target (not shown), and the electromagnetic wave reflected from the target is received by each of the antennas Rx1 and Rx2.

Each of the antennas Rx1 and Rx2 is configured to output the received electromagnetic wave to the beat signal generator 15 as a reception signal.

As described above, the transmitter 13 is configured to radiate the transmission signal to a space, and the receiver 14 is configured to receive the transmission signal reflected from a target to acquire a reception signal.

The beat signal generator 15 includes a mixer 151, a mixer 152, a distribution circuit 153, and a filtering circuit 154.

The mixer 151 is configured to generate a beat signal based on the reception signal input from the antenna Rx1 and the transmission signal input from the transmission control amplifier 122 via the distribution circuit 153, and to output the beat signal to the filtering circuit 154. Similarly, the mixer 152 is configured to generate a beat signal based on the reception signal input from the antenna Rx2 and the transmission signal input from the transmission control amplifier 122 via the distribution circuit 153, and to output the beat signal to the filtering circuit 154.

The filtering circuit 154 includes a band-pass filter (BPF) and an amplifier. The filtering circuit 154 is configured to filter the beat signal input from each of the mixers 151 and 152, and to output the filtered beat signal to the A/D converter 16. By performing the filtering, the BPF suppresses a low frequency component and a high frequency component of the beat signal, which are unnecessary for radar detection, and the amplifier amplifies the signal to a defined magnitude.

As described above, the beat signal generator 15 is configured to generate a beat signal by mixing the reception signal and the transmission signal.

The A/D converter 16 is configured to A/D convert the voltage value of each beat signal input from the filtering circuit 154 in accordance with the A/D control signal input from the controller 11, and to output the A/D converted signal to the signal processor 17. Specifically, the A/D converter 16 is configured to A/D convert the voltage value of the beat signal corresponding to the antenna Rx1 and the voltage value of the beat signal corresponding to the antenna Rx2 based on a defined sampling frequency and a defined number of sampling points.

The signal input from the A/D converter 16 to the signal processor 17 is A/D converted digital data, specifically, digital data D_U_Rx1 and digital data D_U_Rx2 of the beat signals during the up-chirp period, and digital data D_D_Rx1 and digital data D_D_Rx2 of the beat signals during the down-chirp period. The digital data D_U_Rx1 and the digital data D_D_Rx1 correspond to the antenna Rx1, and the digital data D_U_Rx2 and the digital data D_D_Rx2 correspond to the antenna Rx2.

The controller 11 is configured to output, after A/D conversion by the A/D converter 16 is completed, the signal processing control signal to the signal processor 17. The signal processor 17 is configured to perform radar signal processing on the A/D converted digital data input by the A/D converter 16, in accordance with the signal processing control signal input from the controller 11, to thereby calculate information on the target, e.g., a range, a relative velocity, and an angle, as target information. Further, the signal processor 17 is configured to output the calculated target information to the vehicle control device 4. The signal processor 17 may be configured to calculate the target information with use of vehicle information observed by the travel speed sensor 2, the yaw rate sensor 3, or the like.

The controller 11 is configured to operate each component of the FMCW radar device 1 at processing periods T [s] set in advance, to thereby periodically output the target information. As the processing period T, for example, 100 [ms] may be set.

Figure 3:
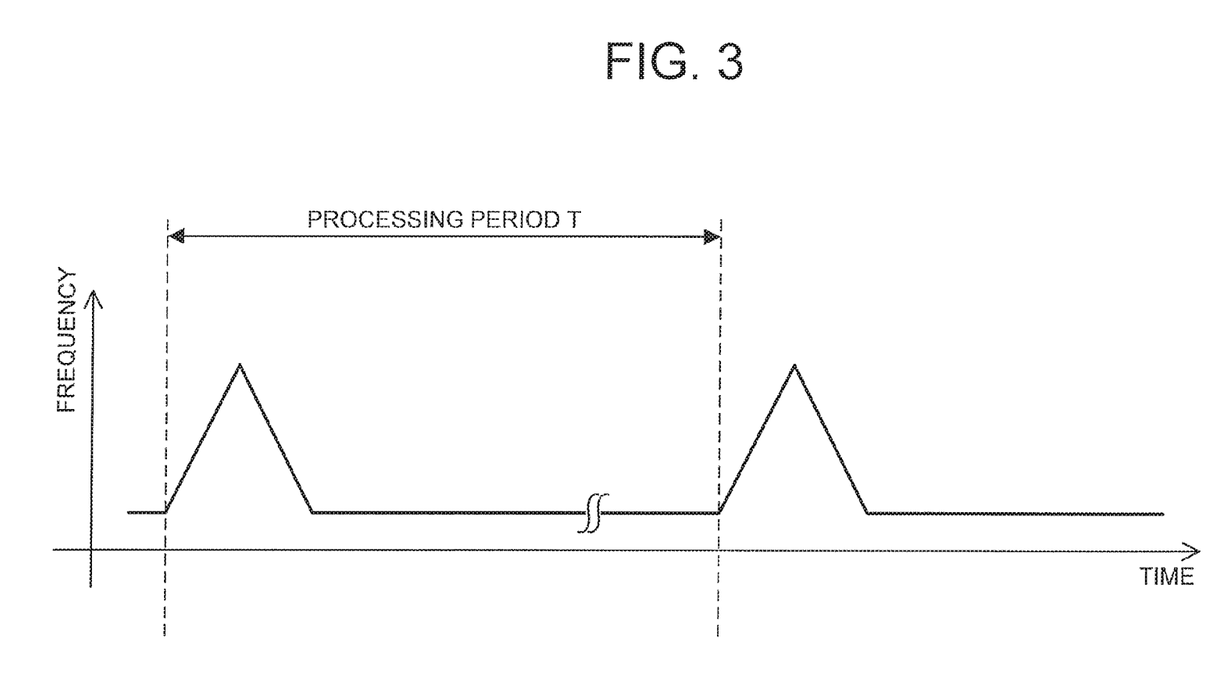
FIG. 3 is an explanatory graph for showing a waveform of the transmission signal to be generated by the transmission signal generator according to the first embodiment of the present invention.

When the controller 11 is configured as described above, a waveform of the transmission signal in each processing period T is as shown in FIG. 3. FIG. 3 is an explanatory graph for showing the waveform of the transmission signal to be generated by the transmission signal generator 12 according to the first embodiment of the present invention. As shown in FIG. 3, at the processing periods T, the up-chirp period and the down-chirp period are repeated.

The vehicle control device 4 is configured to operate various control applications such as a CMB and an ACC based on the target information input from the signal processor 17.

Figure 4:
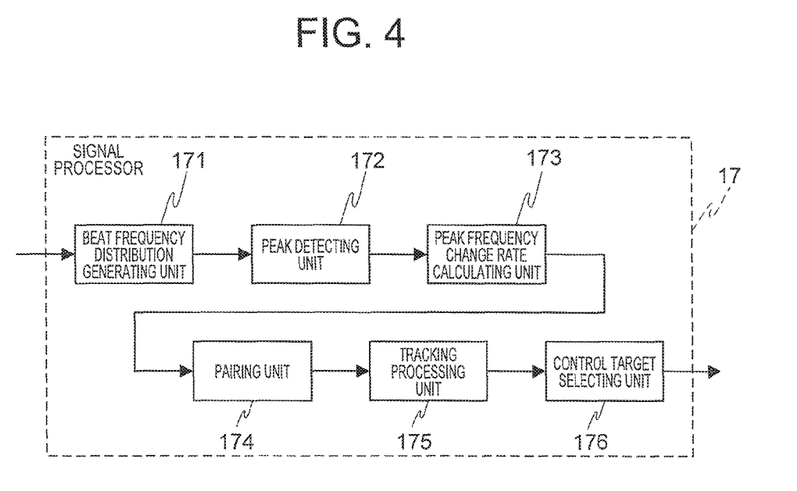
FIG. 4 is a block diagram for illustrating a configuration of a signal processor according to the first embodiment of the present invention.

Next, the signal processor 17 is further described with reference to FIG. 4. FIG. 4 is a block diagram for illustrating the configuration of the signal processor 17 according to the first embodiment of the present invention. The signal processor 17 illustrated in FIG. 4 includes a beat frequency distribution generating unit 171, a peak detecting unit 172, a peak frequency change rate calculating unit 173, a pairing unit 174, a tracking processing unit 175, and a control target selecting unit 176.

The beat frequency distribution generating unit 171 performs frequency analysis processing, e.g., window function multiplication and fast Fourier transform (FFT), on each piece of A/D converted digital data input from the A/D converter 16, to thereby generate each beat frequency distribution corresponding to each piece of A/D converted digital data. Further, the beat frequency distribution generating unit 171 is configured to output each generated beat frequency distribution to the peak detecting unit 172.

Specifically, the beat frequency distribution generating unit 171 is configured to perform frequency analysis processing on the digital data D_U_Rx1 input from the A/D converter 16, to thereby generate a beat frequency distribution FD_U_Rx1 of the beat signal during the up-chirp period. Similarly, the beat frequency distribution generating unit 171 is configured to perform frequency analysis processing on the digital data D_U_Rx2, to thereby generate a beat frequency distribution FD_U_Rx2 of the beat signal during the up-chirp period.

Further, the beat frequency distribution generating unit 171 is configured to perform frequency analysis processing on the digital data D_D_Rx1, to thereby generate a beat frequency distribution FD_D_Rx1 of the beat signal during the down-chirp period. Similarly, the beat frequency distribution generating unit 171 is configured to perform frequency analysis processing on the digital data D_D_Rx2, to thereby generate a beat frequency distribution FD_D_Rx2 of the beat signal during the down-chirp period.

In this case, each beat frequency distribution generated by the beat frequency distribution generating unit 171 is a distribution of a signal subjected to FFT, and hence becomes a discrete frequency distribution. In the following, each sample of a signal subjected to FFT is referred to as "frequency bin". A frequency bin number is allocated to each frequency bin.

As a frequency resolution when performing the FFT is higher, the peak frequency change rate calculating unit 173 to be described later can calculate the peak frequency change rate more accurately. As a result, the accuracy of pairing performed by the pairing unit 174 to be described later can be more improved.

As described above, the beat frequency distribution generating unit 171 is configured to analyze the frequency of the beat signal during the up-chirp period being the first chirp period, to thereby generate a first beat frequency distribution. Further, the beat frequency distribution generating unit 171 is configured to analyze the frequency of the beat signal during the down-chirp period being the second chirp period, to thereby generate a second beat frequency distribution.

The peak detecting unit 172 is configured to, in order to detect a reflection wave from the target during each of the up-chirp period and the down-chirp period, detect a frequency bin corresponding to a peak (hereinafter referred to as "peak frequency bin") from each beat frequency distribution input from the beat frequency distribution generating unit 171. Specifically, the peak detecting unit 172 is configured to, for example, extract a frequency bin having the maximum power and being larger than a threshold set in advance from each beat frequency distribution, to thereby detect the frequency bin as the peak frequency bin.

In the following, the frequency bin number of the peak frequency bin is referred to as "peak frequency bin number". There are a plurality of peak frequency bin numbers when there are a plurality of reflection points.

With the above-mentioned configuration, the peak frequency bin number during the up-chirp period can be obtained for each of the antennas Rx1 and Rx2, and the peak frequency bin number during the down-chirp period can be obtained for each of the antennas Rx1 and Rx2.

The configuration of the peak detecting unit 172 is not limited to the configuration described above. As long as the peak detecting unit 172 can obtain the peak frequency bin corresponding to the reflection wave from the target, any configuration may be employed. For example, the following examples are given as other examples of the configuration of the peak detecting unit 172.

As the first example, the peak detecting unit 172 may be configured to calculate the amplitude of each frequency component based on the beat frequency distribution FD_U_Rx1, calculate the amplitude of each frequency component based on the beat frequency distribution FD_U_Rx2, and add the amplitudes, to thereby calculate an added beat frequency distribution during the up-chirp period. Subsequently, the peak detecting unit 172 may, for example, extract a frequency bin having the maximum power and being larger than a threshold set in advance from the added beat frequency distribution, to thereby detect the frequency bin as the peak frequency bin.

As the second configuration example, a plurality of two or more antennas may be arranged. By applying known digital beam forming (DBF), the peak detecting unit 172 may be configured to calculate the beat frequency distribution subjected to DBF during the up-chirp period. Subsequently, the peak detecting unit 172 may, for example, extract a frequency bin having the maximum power and being larger than a threshold set in advance from the beat frequency distribution subjected to DBF, to thereby detect the frequency bin as the peak frequency bin.

The peak detecting unit 172 may be configured to detect the peak frequency bin by employing the related art described in Japanese Patent Application Laid-open No. 2012-068035, that is, a method of calculating a peak frequency with higher accuracy by interpolating between samples of the FFT. That is, when the beat frequency distribution during each of the up-chirp period and the down-chirp period is obtained as an amplitude for each discrete frequency bin number, under such conditions that, in the beat frequency distribution of each of the up-chirp period and the down-chirp period, the amplitude exceeds a threshold set in advance and is at least the maximum value as compared to the frequency bin numbers before and after the corresponding frequency bin number, the peak detecting unit 172 detects the frequency bin number satisfying the conditions as a temporary peak frequency. Subsequently, the peak detecting unit 172 estimates a true frequency peak in a unit smaller than the frequency resolution based on the amplitudes of the bin numbers before and after the detected temporary peak frequency, and detects the estimated true peak frequency as the peak frequency bin.

As described above, the peak detecting unit 172 is configured to, when the frequency bin number is allocated to the frequency of each of the first beat frequency distribution and the second beat frequency distribution, detect a temporary first peak frequency bin number from the first beat frequency distribution, estimate a true first peak frequency bin number in a unit smaller than the frequency resolution based on the temporary first peak frequency bin number, and detect the true first peak frequency bin number as the first peak frequency. Further, the peak detecting unit 172 is configured to detect a temporary second peak frequency bin number from the second beat frequency distribution, estimate a true second peak frequency bin number in a unit smaller than the frequency resolution based on the temporary second peak frequency bin number, and detect the true second peak frequency bin number as the second peak frequency.

When the peak detecting unit 172 is configured as described above, the peak frequency change rate calculating unit 173 to be described later can calculate the peak frequency change rate with higher accuracy. As a result, the accuracy of the pairing performed by the pairing unit 174 to be described later can be more improved.

As in the configuration example described above, the peak detecting unit 172 is configured to detect the first peak frequency from the first beat frequency distribution, and to detect the second peak frequency from the second beat frequency distribution.

In the first embodiment, there is exemplified a case where the frequency bin number is allocated to the frequency of each of the first beat frequency distribution and the second beat frequency distribution. In this case, the peak detecting unit 172 detects, from the first beat frequency distribution, the first peak frequency bin number as the first peak frequency, and detects, from the second beat frequency distribution, the second peak frequency bin number as the second peak frequency.

The peak frequency change rate calculating unit 173 is configured to obtain a correlation of the peak frequency bin numbers during the up-chirp period between a previous processing period and a current processing period, and to obtain a correlation of the peak frequency bin numbers during the down-chirp period therebetween. The peak frequency change rate calculating unit 173 is configured to subsequently calculate, based on the result of those correlations, a peak frequency bin number change rate, which is a difference between peak frequency bin numbers that are considered to correspond to the reflection waves from the same target in the previous processing period and the current processing period, for each of the up-chirp period and the down-chirp period.

In this case, the current processing period refers to the latest processing period at which the reflection wave from the target is observed by the FMCW radar device 1, and the previous processing period refers to a processing period performed before the current processing period.

For example, the following case is considered. When there are two targets A and B, in an n-th processing period corresponding to the previous processing period, peak frequency bin numbers $A(n)$ and $B(n)$ corresponding to the targets A and B, respectively, are obtained, and in an $(n+1)$th processing period corresponding to the current processing period, peak frequency bin numbers $A(n+1)$ and $B(n+1)$ corresponding to the targets A and B, respectively, are obtained.

In the above-mentioned case, the peak frequency change rate calculating unit 173 obtains correlations between the peak frequency bin numbers $A(n)$ and $B(n)$ and the peak frequency bin numbers $A(n+1)$ and $B(n+1)$. Examples of the method of obtaining the correlation include a method involving determining that the correlation can be obtained when such a condition is satisfied that a difference in peak frequency bin number between the peak frequency bin numbers $A(n)$ and $B(n)$ and the peak frequency bin numbers $A(n+1)$ and $B(n+1)$ is smaller than a threshold set in advance, and determining that the correlation cannot be obtained when the condition is not satisfied.

For example, when a correlation can be obtained between the peak frequency bin number $A(n)$ and the peak frequency bin number $A(n+1)$, and a correlation can be obtained between the peak frequency bin number $B(n)$ and the peak frequency bin number $B(n+1)$, the peak frequency change rate calculating unit 173 calculates the peak frequency bin number change rate for each peak frequency bin number at which a correlation can be obtained as described below.

Peak frequency bin number change rate
$A(n+1)$=peak frequency bin number $A(n+1)$- peak frequency bin number $A(n)$ Peak frequency bin number change rate
$B(n+1)$=peak frequency bin number $B(n+1)$- peak frequency bin number $B(n)$ The peak frequency change rate calculating unit 173 is configured to perform calculation as described above during each of the up-chirp period and the down-chirp period, to thereby calculate a peak frequency bin number change rate during the up-chirp period and a peak frequency bin number change rate during the down-chirp period as many as the number of the peak frequency bin numbers at which the correlation can be obtained between the previous processing period and the current processing period. Further, the peak frequency change rate calculating unit 173 is configured to output the calculation result to the pairing unit 174.

As described above, the peak frequency change rate calculating unit 173 is configured to calculate a first peak frequency change rate based on the first peak frequency in the current processing period and the first peak frequency in the previous processing period. Further, the peak frequency change rate calculating unit 173 is configured to calculate a second peak frequency change rate based on the second peak frequency in the current processing period and the second peak frequency in the previous processing period.

Specifically, the peak frequency change rate calculating unit 173 is configured to calculate a difference between the first peak frequency in the current processing period and the first peak frequency in the previous processing period as the first peak frequency change rate. Further, the peak frequency change rate calculating unit 173 is configured to calculate a difference between the second peak frequency in the current processing period and the second peak frequency in the previous processing period as the second peak frequency change rate.

The pairing unit 174 is configured to perform pairing with use of the peak frequency bin number change rate during each of the up-chirp period and the down-chirp period input from the peak frequency change rate calculating unit 173. Further, the pairing unit 174 is configured to calculate the target information based on the pairing result. In the following, with use of numerical expressions, the operation of the pairing unit 174 is specifically described.

In this case, in the FMCW radar device 1, the speed of light is represented by C [m/s], the modulation frequency width is represented by B [Hz], the wavelength of the transmission wave is represented by λ [m], and the frequency resolution is represented by Δf[Hz]. In this case, a range resolution ΔR [m/bin] per frequency bin and a relative velocity resolution ΔV [m/s/bin] per frequency bin are represented by Expressions (1) and (2), respectively.

$$\Delta R = C/(2 \times B) \tag{1}$$

$$\Delta V = \Delta f \times \lambda / 2 \tag{2}$$

Further, from the principle of the FMCW radar, in the n-th processing period, when a reflection wave from a target having a range of R(n) [m] and a relative velocity of V(n) [m/s] is observed, assuming that the unit of the relative velocity is negative in an approaching direction and is positive in a separating direction, approach of the target increases the beat frequency due to the Doppler effect. Therefore, a peak frequency bin number U(n) [bin] during the up-chirp period and a peak frequency bin number D(n) [bin] during the down-chirp period are represented by Expressions (3) and (4), respectively.

$$U(n) = -R(n)/\Delta R - V(n)/\Delta V \tag{3}$$

$$D(n) = R(n)/\Delta R - V(n)/\Delta V \tag{4}$$

Further, in an (n+1)th processing period, when a reflection wave from the target having a range of R(n+1) [m] and a relative velocity of V(n+1) [m/s] is observed, considering similarly to the above, a peak frequency bin number U(n+1) [bin] during the up-chirp period and a peak frequency bin number D(n+1) [bin] during the down-chirp period are represented by Expressions (5) and (6), respectively.

$$U(n+1) = -R(n+1)/\Delta R - V(n+1)/\Delta V \tag{5}$$

$$D(n+1) = R(n+1)/\Delta R - V(n+1)/\Delta V \tag{6}$$

Subsequently, with use of a peak frequency bin number change rate dU (=U(n+1)−U(n)) during the up-chirp period and a peak frequency bin number change rate dD (=D(n+1)−D(n)) during the down-chirp period, Expressions (7) and (8) can be obtained from Expressions (3) to (6).

$$dU = -(R(n+1) - R(n))/\Delta R - (V(n+1) - V(n))/\Delta V \tag{7}$$

$$dD = (R(n+1) - R(n))/\Delta R - (V(n+1) - V(n))/\Delta V \tag{8}$$

Further, in Expressions (7) and (8), when R(n+1)−R(n) is set as a range change rate dR [m/period] per processing period and V(n+1)−V(n) is set as a relative velocity change rate dV [m/s/period] per processing period, Expressions (9) and (10) can be obtained.

$$dU = -dR/\Delta R + dV/\Delta V \tag{9}$$

$$dD = dR/\Delta R + dV/\Delta V \tag{10}$$

In Expressions (9) and (10), dU and dD are observable values, and ΔR and ΔV are fixed values determined by Expressions (1) and (2). Therefore, by solving the system of equations of Expressions (9) and (10), the range change rate dR and the relative velocity change rate dV can be calculated.

Subsequently, when the processing period is represented by T[s], and the relative velocity change rate dV per processing period is sufficiently small, the following relationship represented by Expression (11) is satisfied between the range change rate dR per processing period and the relative velocity V(n+1). In other words, the relative velocity V(n+1) is calculated based on the range change rate dR in accordance with Expression (11), and is estimated as a relative velocity estimated value.

$$V(n+1) = dR/T \tag{11}$$

When the relative velocity change rate dV per processing period cannot be said to be sufficiently small, assuming that the acceleration from the n-th processing period to the (n+1)th processing period T, that is, the relative velocity change rate dV is constant, the relative velocity V(n+1) may be calculated based on the range change rate dR and the relative velocity change rate dV.

As described above, the pairing unit 174 is configured to calculate a range change rate and a relative velocity change rate based on the first peak frequency change rate and the second peak frequency change rate, and to calculate a relative velocity estimated value in the current processing period based on the range change rate and the relative velocity change rate.

Subsequently, when Expression (11) is substituted into Expression (5), the peak frequency bin number U(n+1) during the up-chirp period is represented by Expression (12).

$$U(n+1) = -R(n+1)/\Delta R - (dR/T)/\Delta V \quad (12)$$

Further, when Expression (12) is transformed, Expression (13) is obtained.

$$\Delta R \times U(n+1) = -R(n+1) - \Delta R \times (dR/T)/\Delta V$$

$$R(n+1) = -\Delta R \times U(n+1) - \Delta R \times (dR/T)/\Delta V \quad (13)$$

As is understood from Expression (13), the range R(n+1) in the (n+1)th processing period is calculated based on the peak frequency bin number U(n+1) during the up-chirp period. This range R(n+1) is referred to as "temporary range" during the up-chirp period. The temporary range during the up-chirp period is calculated in accordance with Expression (13).

As described above, the pairing unit 174 is configured to calculate a first temporary range during the up-chirp period based on the relative velocity estimated value and the first peak frequency in the current processing period.

Similarly to the above, when Expression (11) is substituted into Expression (6) the peak frequency bin number D(n+1) during the down-chirp period is represented by Expression (14).

$$D(n+1) = R(n+1)/\Delta R - (dR/T)/\Delta V \quad (14)$$

Further, when Expression (14) is transformed, Expression (15) is obtained.

$$\Delta R \times D(n+1) = R(n+1) - \Delta R \times (dR/T)/\Delta V$$

$$R(n+1) = \Delta R \times D(n+1) + \Delta R \times (dR/T)/\Delta V \quad (15)$$

As is understood from Expression (15), the range R(n+1) in the (n+1)th processing period is calculated based on the peak frequency bin number D(n+1) during the down-chirp period. This range R(n+1) is referred to as "temporary range" during the down-chirp period. The temporary range during the down-chirp period is calculated in accordance with Expression (15).

As described above, the pairing unit 174 is configured to calculate a second temporary range during the down-chirp period based on the relative velocity estimated value and the second peak frequency in the current processing period.

In an actual case, it is considered that, due to an error in observation or the like, there is a difference between the temporary range during the up-chirp period and the temporary range during the down-chirp period.

In view of this, the pairing unit 174 is configured to, when the peak frequency bin number during the up-chirp period and the peak frequency bin number during the down-chirp period are paired with each other, calculate the temporary range during the up-chirp period with use of the peak frequency bin number during the up-chirp period, and calculate the temporary range during the down-chirp period with use of the peak frequency bin number during the down-chirp period. The pairing unit 174 is configured to subsequently calculate the difference between the temporary range during the up-chirp period and the temporary range during the down-chirp period, and to pair the peak frequency bin numbers during the respective up-chirp period and down-chirp period, which correspond to those temporary ranges, with each other when this difference is equal to or less than a set threshold. With this configuration, it is possible to suppress occurrence of erroneous pairing.

As described above, the pairing unit 174 is configured to, when the difference between the first temporary range and the second temporary range is equal to or less than a set threshold, pair the first peak frequency and the second peak frequency in the current processing period with each other.

The pairing unit 174 is configured to calculate the range R(n+1) and the relative velocity V(n+1) based on the peak frequency bin number U(n+1) and the peak frequency bin number D(n+1) that have established a pair in accordance with Expressions (16) and (17) by a method similar to that of a known radar employing an FMCW radar system.

$$R(n+1) = (-U(n+1) + D(n+1)) \times \Delta R/2 \quad (16)$$

$$V(n+1) = (-U(n+1) - D(n+1)) \times \Delta V/2 \quad (17)$$

When the pairing is performed by the pairing unit 174, other conditions may be further employed. Examples of the conditions include amplitude of the peak corresponding to the peak frequency bin number, electric power, and an angle.

In this case, regarding the above-mentioned angle, during each of the up-chirp period and the down-chirp period, the angle may be calculated based on the phase of the antenna Rx1 and the phase of the antenna Rx2 by a phase mono-pulse system. Further, by employing a hardware configuration and a software configuration that can apply other angular measurement systems, such as a system of multiple signal classification (MUSIC) and a system of estimation of signal parameters via rotational invariance techniques (ESPRIT), the angle may be calculated for each of the up-chirp period and the down-chirp period.

The angle after the pairing can also be calculated by employing known angular measurement systems such as the phase mono-pulse system, the MUSIC system, and the ESPRIT system. As described above, when the angle is calculated during each of the up-chirp period and the down-chirp period, a value obtained by averaging the angles of the respective chirp periods may be set as the angle after the pairing, or any one of the angles may be selected as a representative value to set the representative value as the angle after the pairing. The above-mentioned angular measurement systems are merely examples, and the present invention is established independent of the angular measurement system.

In the first embodiment, there is exemplified a case where the peak frequency bin number during the up-chirp period and the peak frequency bin number during the down-chirp period are paired with each other. However, as can be estimated from Expressions (13) and (15), it is not always necessary to pair the peak frequency bin number during the up-chirp period and the peak frequency bin number during the down-chirp period with each other, and the following configuration may be employed.

That is, for example, the peak frequency bin number during the first chirp period and the peak frequency bin number during the second chirp period may be paired with each other. In this case, during the first chirp period, the range resolution is $\Delta R1$ [m/bin], and the relative velocity resolution is $\Delta V1$ [m/s/bin], and during the second chirp period, the range resolution is $\Delta R2$ [m/bin], and the relative velocity resolution is $\Delta V2$ [m/s/bin]. Further, during the second chirp period, at least the range resolution or the relative velocity resolution differs from that in the first chirp period. In the following, this configuration is specifically described.

The range resolution per frequency bin during the first chirp period is represented by $\Delta R1$ [m/bin], the relative velocity resolution per frequency bin during the first chirp period is represented by $\Delta V1$ [m/s/bin], the range resolution per frequency bin during the second chirp period is represented by $\Delta R2$ [m/bin], the relative velocity resolution per frequency bin during the second chirp period is represented by $\Delta V2$ [m/s/bin], the range and the relative velocity of the target in the n-th processing period are represented by R(n) [m] and V(n) [m/s], respectively, and the range and the relative velocity of the target in the (n+1)th processing period are represented by R(n+1) [m] and V(n+1) [m/s], respectively.

In the above-mentioned case, a peak frequency bin number C1(n) during the first chirp period in the n-th processing period, a peak frequency bin number C2(n) during the second chirp period in the n-th processing period, a peak frequency bin number C1(n+1) during the first chirp period in the (n+1)th processing period, and a peak frequency bin number C2(n+1) during the second chirp period in the (n+1)th processing period are represented by Expressions (18) to (21), respectively.

$$C1(n) = R(n)/\Delta R1 + V(n)/\Delta V1 \qquad (18)$$

$$C2(n) = R(n)/\Delta R2 + V(n)/\Delta V2 \qquad (19)$$

$$C1(n+1) = R(n+1)/\Delta R1 + V(n+1)/\Delta V1 \qquad (20)$$

$$C2(n+1) = R(n+1)/\Delta R2 + V(n+1)/\Delta V2 \qquad (21)$$

In Expressions (3) to (6), each term is multiplied by a negative coefficient as appropriate. In this case, in order to generalize the expressions, the negative coefficient is included in $\Delta R1$, $\Delta V1$, $\Delta R2$, and $\Delta V2$ as necessary. For example, when Expressions (3) and (4) are represented as Expressions (18) and (19), and C1(n)=U(n) and C2(n)=D(n) are satisfied, $\Delta R1$, $\Delta V1$, $\Delta R2$, and $\Delta V2$ are represented by Expressions (22) to (25), respectively.

$$\Delta R1 = -\Delta R \qquad (22)$$

$$\Delta R2 = \Delta R \qquad (23)$$

$$\Delta V1 = -\Delta V \qquad (24)$$

$$\Delta V2 = -\Delta V \qquad (25)$$

Subsequently, with use of a peak frequency bin number change rate dC1 (=C1(n+1)−C1(n)) during the first chirp period and a peak frequency bin number change rate dC2 (=C2(n+1)−C2(n)) during the second chirp period, Expressions (26) and (27) can be obtained based on Expressions (18) to (21).

$$dC1 = dR/\Delta R1 + dV/\Delta V1 \qquad (26)$$

$$dC2 = dR/\Delta R2 + dV/\Delta V2 \qquad (27)$$

In Expressions (26) and (27), dC1 and dC2 are observable values, and $\Delta R1$, $\Delta R2$, $\Delta V1$, and $\Delta V2$ are fixed values. Therefore, by solving the system of equations of Expressions (26) and (27), the range change rate dR and the relative velocity change rate dV can be calculated.

After that, with calculation similar to that of the process of deriving Expressions (13) and (15), expressions similar to Expressions (13) and (15) can be obtained as expressions for calculating the temporary range during the first chirp period and the temporary range during the second chirp period. In accordance with the expressions obtained as described above, the temporary range during the first chirp period is calculated based on the peak frequency bin number C1(n+1), and the temporary range during the second chirp period is calculated based on the peak frequency bin number C2(n+1).

In order to achieve the processing to be performed by the pairing unit 174 described so far, the peak frequency change rate calculating unit 173 is required to appropriately obtain a correlation of the peak frequency bin numbers, which are considered as reflections from the same target, between the previous processing period and the current processing period.

In this case, as a method of obtaining a correlation, there is a method of, assuming that the peak frequency bin number in the previous processing period and the peak frequency bin number in the current processing period, which have the smallest difference in peak frequency bin number, are derived from reflections from the same target, calculating the difference between those peak frequency bin numbers. This method is relatively easy processing, and hence there are advantages in that the processing load is small and the amount of memory can be suppressed.

Further, there is also given a method of calculating the difference between peak frequency bin numbers of the previous processing period and the current processing period in a brute-force manner, to thereby use the result for the pairing. In this case, the difference between the peak frequency bin numbers may be calculated with use of peak frequency bin numbers that are not always derived from reflections from the same target. However, as compared to a configuration of simply pairing all of the peak frequency bin numbers during the up-chirp period and the peak frequency bin numbers during the down-chirp period in a brute-force manner, in the configuration of the first embodiment, when the difference between the temporary range during the up-chirp period and the temporary range during the down-chirp period is larger than the set threshold, the peak frequency bin numbers during the respective up-chirp period and down-chirp period corresponding to those temporary ranges are not paired with each other. Therefore, in the configuration of the first embodiment, occurrence of the erroneous pairing can be suppressed.

The peak frequency bin number change rate may be calculated with use of a method of performing tracking processing on a frequency axis as described in Japanese Patent Application Laid-open No. 2010-19824.

That is, the peak frequency change rate calculating unit 173 is configured to predict, in every processing period, a peak frequency bin number in the current processing period based on a smoothed peak frequency bin number and a smoothed peak frequency bin number change rate in the previous processing period, and to calculate the predicted value as a predicted peak frequency bin number. As described above, the peak frequency change rate calculating unit 173 is configured to predict a first predicted peak frequency in the current processing period based on a smoothed first peak frequency and a smoothed first peak frequency change rate in the previous processing period. Further, the peak frequency change rate calculating unit 173 is configured to predict a second predicted peak frequency in the current processing period based on a smoothed second peak frequency and a smoothed second peak frequency change rate in the previous processing period.

The peak frequency change rate calculating unit 173 is configured to subsequently obtain a correlation between the peak frequency bin number in the current processing period and the predicted peak frequency bin number. As described above, the peak frequency change rate calculating unit 173 is configured to obtain a correlation between the first peak frequency in the current processing period and the first predicted peak frequency. Further, the peak frequency change rate calculating unit 173 is configured to obtain a correlation between the second peak frequency in the current processing period and the second predicted peak frequency.

The peak frequency change rate calculating unit 173 is configured to subsequently smooth the peak frequency bin number in the current processing period and the predicted peak frequency bin number, which have obtained the correlation therebetween, through tracking filter processing, to thereby calculate the smoothed peak frequency bin number and the smoothed peak frequency bin number change rate. As described above, the peak frequency change rate calculating unit 173 is configured to perform the tracking filter processing on the first peak frequency in the current processing period and the first predicted peak frequency, which have obtained the correlation therebetween, to thereby calculate the smoothed first peak frequency and the smoothed first peak frequency change rate. Further, the peak frequency change rate calculating unit 173 is configured to perform the tracking filter processing on the second peak frequency in the current processing period and the second predicted peak frequency, which have obtained the correlation therebetween, to thereby calculate a smoothed second peak frequency and a smoothed second peak frequency change rate.

The peak frequency change rate calculating unit 173 is configured to subsequently set the smoothed peak frequency bin number change rate as the peak frequency bin number change rate in the current processing period. As described above, the peak frequency change rate calculating unit 173 is configured to set the smoothed first peak frequency as the first peak frequency in the current processing period, and to set the smoothed second peak frequency as the second peak frequency in the current processing period.

The tracking filter processing is processing for estimating true observation values of, e.g., the range, the relative velocity, and the angle, including the observation error obtained from a sensor. Specifically, there are known an αβ filter and a Kalman filter.

As described above, the peak frequency change rate calculating unit 173 is configured to perform time-series processing on each of the first peak frequency and the second peak frequency in the previous processing period, and on each of the first peak frequency and the second peak frequency in the current processing period, to thereby calculate the first peak frequency change rate and the second peak frequency change rate.

The peak frequency change rate calculating unit 173 may be configured to calculate the peak frequency bin number change rate with use of the following method.

That is, the peak frequency change rate calculating unit 173 is configured to predict a range and a relative velocity in the current processing period based on a range and a relative velocity in the previous processing period, which are obtained when pairing is established in the previous processing period. The peak frequency change rate calculating unit 173 is configured to subsequently predict the peak frequency bin number in the current processing period from the predicted range and relative velocity based on the principle of the FMCW radar system represented by Expressions (3) and (4) and the like.

The peak frequency change rate calculating unit 173 is configured to, when a peak frequency bin number is observed in the vicinity of the predicted peak frequency bin number in the current processing period, subsequently obtain a correlation assuming that the observed peak frequency bin number is derived from the target that has established pairing in the previous processing period, to thereby calculate the peak frequency bin number change rate per processing period. The calculated peak frequency bin number change rate is used for pairing to be performed by the pairing unit 174.

The tracking processing unit 175 is configured to perform known tracking processing for obtaining a time-series correlation on the observation value of the target information obtained after the pairing, to thereby smooth each observation value with a tracking filter, or to perform interpolation or extrapolation when the target cannot be temporarily detected. In the first embodiment, the target information is given as an example, but coordinate conversion from polar coordinates to Cartesian coordinates may be performed as necessary.

The control target selecting unit 176 is configured to extract a target as a selected target, which is required in various applications in the vehicle control device 4 in order to perform vehicle control and various warnings. For example, when applications for forward objects, such as the ACC and the CMB, are incorporated into the vehicle control device 4, the control target selecting unit 176 is configured to estimate the traveling direction of the own vehicle based on the detected value by the travel speed sensor 2 or the yaw rate sensor 3, and to select, as the selected target, the target closest to the own vehicle among the targets present in the own vehicle lane.

In the first embodiment, only the travel speed sensor 2 and the yaw rate sensor 3 are described as sensors for extracting a focused target, but sensors necessary for extracting the focused target are added as appropriate in accordance with the specifications of the applications.

The present invention is not limited to the configuration of the first embodiment and the operation of the configuration described above, and the first embodiment can be appropriately modified or partially omitted within the scope of the present invention.

For example, as described above, even when the number of the antennas of each of the transmitter 13 and the receiver 14 is increased or decreased as appropriate, the present invention is established as long as the transmission signal generator 12, the beat signal generator 15, and the A/D converter 16 are provided in accordance with the number of the antennas. Further, the present invention is established even when a part of the components of the FMCW radar device 1 is separated or isolated, e.g., even when a part or the whole of the components of the signal processor 17 are incorporated into the vehicle control device 4.

Further, in the first embodiment, description has been made assuming that the processing period T is constant, but the processing period T is not always required to be constant. When the processing period T is not constant, processing may be performed while replacing the processing using the range change rate, the relative velocity change rate, and the peak frequency bin number change rate per processing period with that using the change rates per unit time in accordance with Expressions (7) and (8), for example.

As described above, according to the first embodiment, the first peak frequency change rate during the first chirp period and the second peak frequency change rate during the second chirp period are used to calculate the first temporary range during the first chirp period and the second temporary range during the second chirp period. When the difference between the first temporary range and the second temporary range is equal to or less than a set threshold, the first peak frequency and the second peak frequency in the current processing period are paired with each other. With this, a pair is not established between peak frequencies having temporary ranges that are significantly different from each other. Therefore, in the FMCW radar device, as compared to the case where pairs are obtained between all of the first peak frequencies and all of the second peak frequencies, the occurrence frequency of pairing errors can be reduced.

Further, the above-mentioned configuration may be used in combination with conditions of peak intensity and the like as in the related art disclosed in Japanese Patent Application Laid-open No. Hei 4-343084. In this case, even when the peak intensities are substantially the same as in the related art disclosed in Japanese Patent Application Laid-open No. Hei 4-343084, when the difference between the first temporary range and the second temporary range is larger than a set threshold, this pair can be removed as an erroneous pair. Further, in the above-mentioned configuration, the processing is not performed on the premise of linear uniform motion, and hence the configuration is effective even when the own vehicle and the target accelerate or decelerate.

What is claimed is:

1. An FMCW radar device, comprising:
    a transmission signal generator configured to generate a transmission signal having a first chirp period and a second chirp period;
    a transmitter configured to radiate the transmission signal to a space;
    a receiver configured to receive the transmission signal reflected from a target to acquire a reception signal;
    a beat signal generator configured to generate a beat signal by mixing the reception signal and the transmission signal; and
    a signal processor,
    the signal processor comprising:
        a beat frequency distribution generating unit configured to generate a first beat frequency distribution by analyzing a frequency of the beat signal during the first chirp period, and to generate a second beat frequency distribution by analyzing a frequency of the beat signal during the second chirp period;
        a peak detecting unit configured to detect a first peak frequency from the first beat frequency distribution, and to detect a second peak frequency from the second beat frequency distribution;
        a peak frequency change rate calculating unit configured to calculate a first peak frequency change rate based on the first peak frequency in a current processing period and the first peak frequency in a previous processing period performed before the current processing period, and to calculate a second peak frequency change rate based on the second peak frequency in the current processing period and the second peak frequency in the previous processing period; and
        a pairing unit configured to:
            calculate a range change rate and a relative velocity change rate based on the first peak frequency change rate and the second peak frequency change rate;
            calculate a relative velocity estimated value in the current processing period based on the range change rate and the relative velocity change rate;
            calculate a first temporary range based on the relative velocity estimated value and the first peak frequency in the current processing period;
            calculate a second temporary range based on the relative velocity estimated value and the second peak frequency in the current processing period; and
            pair the first peak frequency and the second peak frequency in the current processing period with each other when a difference between the first temporary range and the second temporary range is equal to or less than a set threshold.

2. An FMCW radar device according to claim 1,
    wherein the first chirp period comprises an up-chirp period, and
    wherein the second chirp period comprises a down-chirp period.

3. An FMCW radar device according to claim 1, wherein the second chirp period differs in one of a range resolution and a relative velocity resolution from the first chirp period.

4. An FMCW radar device according to claim 1, wherein the peak detecting unit is configured to, when a frequency bin number is allocated to a frequency of each of the first beat frequency distribution and the second beat frequency distribution:
    detect, as the first peak frequency, a first peak frequency bin number from the first beat frequency distribution; and
    detect, as the second peak frequency, a second peak frequency bin number from the second beat frequency distribution.

5. An FMCW radar device according to claim 1, wherein the peak detecting unit is configured to, when a frequency bin number is allocated to a frequency of each of the first beat frequency distribution and the second beat frequency distribution:
    detect a temporary first peak frequency bin number from the first beat frequency distribution;
    estimate a true first peak frequency bin number in a unit smaller than a frequency resolution based on the temporary first peak frequency bin number;
    detect the true first peak frequency bin number as the first peak frequency;
    detect a temporary second peak frequency bin number from the second beat frequency distribution;
    estimate a true second peak frequency bin number in a unit smaller than the frequency resolution based on the temporary second peak frequency bin number; and
    detect the true second peak frequency bin number as the second peak frequency.

6. An FMCW radar device according to claim 1, wherein the peak frequency change rate calculating unit is configured to:
    calculate, as the first peak frequency change rate, a difference between the first peak frequency in the current processing period and the first peak frequency in the previous processing period; and
    calculate, as the second peak frequency change rate, a difference between the second peak frequency in the current processing period and the second peak frequency in the previous processing period.

7. An FMCW radar device according to claim 1, wherein the peak frequency change rate calculating unit is configured to perform time-series processing on each of the first peak frequency and the second peak frequency in the previous processing period, and on each of the first peak frequency and the second peak frequency in the current processing period, to thereby calculate the first peak frequency change rate and the second peak frequency change rate.

8. An FMCW radar device according to claim 7, wherein the peak frequency change rate calculating unit is configured to, as the time-series processing, in every processing period:
    predict a first predicted peak frequency in the current processing period based on a smoothed first peak frequency and a smoothed first peak frequency change rate in the previous processing period;

predict a second predicted peak frequency in the current processing period based on a smoothed second peak frequency and a smoothed second peak frequency change rate in the previous processing period;

obtain a correlation between the first peak frequency in the current processing period and the first predicted peak frequency;

obtain a correlation between the second peak frequency in the current processing period and the second predicted peak frequency;

perform tracking filter processing on the first peak frequency in the current processing period and the first predicted peak frequency, which have obtained the correlation therebetween, to thereby calculate the smoothed first peak frequency and the smoothed first peak frequency change rate;

perform the tracking filter processing on the second peak frequency in the current processing period and the second predicted peak frequency, which have obtained the correlation therebetween, to thereby calculate the smoothed second peak frequency and the smoothed second peak frequency change rate;

set the smoothed first peak frequency as the first peak frequency in the current processing period; and set the smoothed second peak frequency as the second peak frequency in the current processing period.

\* \* \* \* \*